(12) United States Patent
Crane, Jr. et al.

(10) Patent No.: US 12,121,006 B1
(45) Date of Patent: Oct. 22, 2024

(54) ANIMAL COLLAR THAT IS PERSONALIZABLE WITH CHARMS

(71) Applicant: We Create Products LLC, Moorestown, NJ (US)

(72) Inventors: Richard P. Crane, Jr., Hainesport, NJ (US); Richard P. Crane, Sr., Dover, DE (US)

(73) Assignee: We Create Products LLC, Moorestown, NJ (US)

( * ) Notice: Subject to any disclaimer, the term of this patent is extended or adjusted under 35 U.S.C. 154(b) by 0 days.

(21) Appl. No.: 18/736,622

(22) Filed: Jun. 7, 2024

Related U.S. Application Data

(60) Provisional application No. 63/621,721, filed on Jan. 17, 2024.

(51) Int. Cl.
*A01K 27/00* (2006.01)
(52) U.S. Cl.
CPC .................... *A01K 27/001* (2013.01)
(58) Field of Classification Search
CPC .. A01K 27/001; A01K 27/002; A01K 27/003; A01K 27/006
See application file for complete search history.

(56) References Cited

U.S. PATENT DOCUMENTS

| | | | | |
|---|---|---|---|---|
| 6,422,177 B1* | 7/2002 | Noguero | ............ | A01K 27/006 119/858 |
| 7,421,980 B1* | 9/2008 | Ehlers | ................ | A01K 27/006 119/858 |
| 9,149,095 B2* | 10/2015 | Inglis | ................ | A44C 17/0208 |
| 9,185,965 B1* | 11/2015 | Bhati | ........................ | A45F 5/00 |
| 2006/0283402 A1* | 12/2006 | Smith | ................ | A01K 27/006 119/863 |
| 2009/0188442 A1* | 7/2009 | Dawe | ................. | A01K 27/006 119/858 |
| 2010/0277943 A1* | 11/2010 | Hurwitz | ................. | A44C 1/00 362/570 |
| 2021/0400919 A1* | 12/2021 | Dunlevy | ............. | A01K 27/006 |

FOREIGN PATENT DOCUMENTS

CH   718514 A2 * 10/2022   ........... A01K 27/001

\* cited by examiner

*Primary Examiner* — Trinh T Nguyen
(74) *Attorney, Agent, or Firm* — H. Brock Kolls

(57) ABSTRACT

The present invention relates to an animal collar that is personalizable with charms. The animal collar includes a buckle, a mesh material, and an elastomer strap that is formed around and encapsulates the mesh material. The elastomer strap attaches to the buckle. The elastomer strap has a plurality of buckle holes and a plurality of charm retaining holes. Charms can be secured into one or more of the charm retaining holes. Plugs can be fitted into the charm retaining holes, in a removable manner. A gripping texture can be integrally formed on the surface of the elastomer strap. The charm can include an emblem, a first charm fastener side, a second charm fastener side, and a charm collar that is sized to fit through the charm retaining hole. The first and second charm fastener sides fasten together securing the charm to the elastomer band.

19 Claims, 16 Drawing Sheets

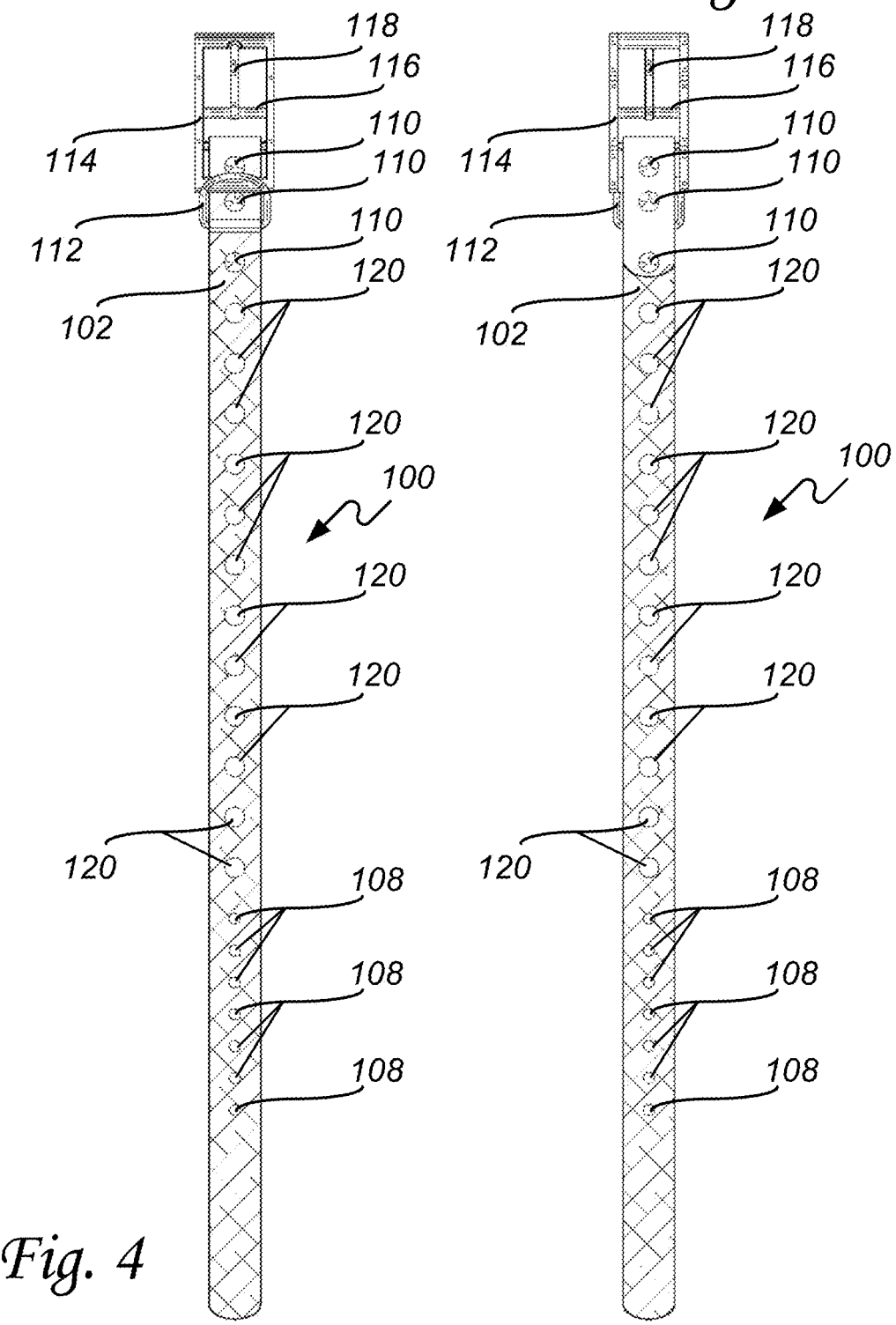

Fig. 15
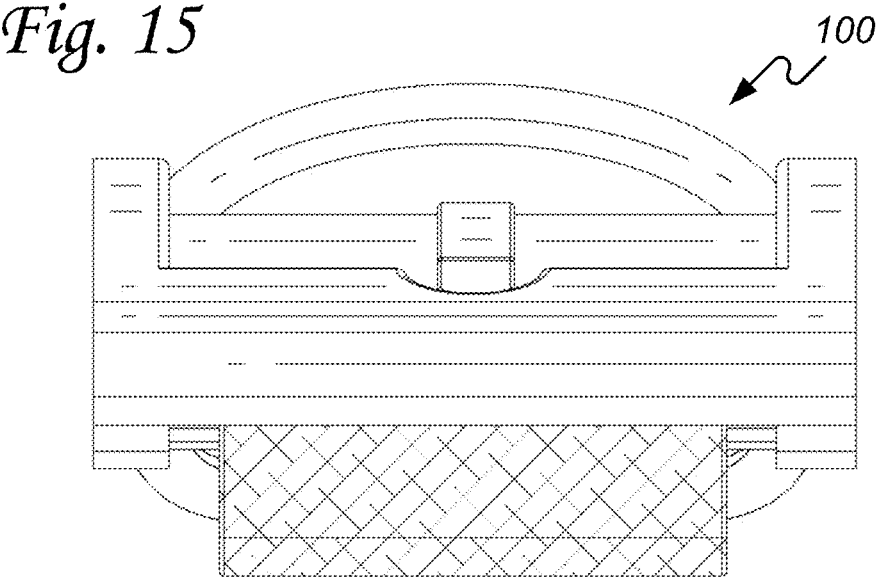
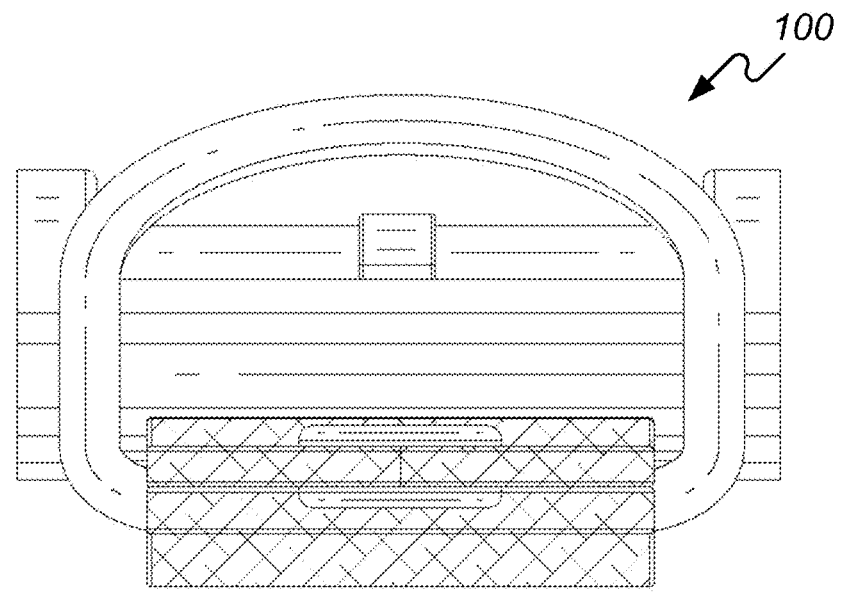
Fig. 16

ANIMAL COLLAR THAT IS PERSONALIZABLE WITH CHARMS

CROSS-REFERENCE TO RELATED APPLICATIONS

This application contains subject matter which is related to the subject matter of the following co-pending application. The below-listed application is hereby incorporated herein by reference in its entirety:

This is a U.S. non-provisional application that is a continuation in part of a U.S. non-provisional application, Ser. No. 63/621,721, inventor Richard P. Crane Jr., entitled "DOG COLLAR THAT IS PERSONALIZABLE WITH CHARMS", filed Jan. 17, 2024.

TECHNICAL FIELD OF THE INVENTION

This invention relates to an animal collar that is personalizable with charms. An elastomer band formed around a mesh material can have one or more charm retaining holes. One or more charms can be secured into one or more charm retaining holes and one or more plugs can be fitted into the empty charm retaining holes. The animal collar can be worn by an animal.

BACKGROUND OF THE INVENTION

Before our invention animals, such as dogs and cats, commonly wore collars. While name tags are often attached to the collar, they tend to just hang on a small chain link proximate to the throat area of the animal and are seldom prominently displayed around the perimeter of the collar. A shortcoming is that it is difficult to customize current collars and position customization and other accents along the collar surface. In this regard, such customization might include the animal's name and other ornamentation that better captures the personality of the animal.

Another shortcoming is that current collars are difficult to personalize with color accent combinations and are not easily modifiable.

The present invention addresses these and other shortcomings by providing an animal collar that is personalizable with charms and other advantages. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of an animal collar that is personalizable with charms. The animal collar can comprise a buckle, a mesh material, and an elastomer strap that is formed around and encapsulates the mesh material. The elastomer strap attaches to the buckle. The elastomer strap can have a plurality of buckle holes and a plurality of charm retaining holes. The animal collar further comprises one or more plugs. The plugs fit into the charm retaining holes, in a removable manner.

Additional shortcomings of the prior art are overcome and additional advantages are provided through the provision of an animal collar that is personalizable with charms. The animal collar can comprise a buckle, a mesh material, and an elastomer strap that is formed around and encapsulates the mesh material. The elastomer strap attaches to the buckle. The elastomer strap can have a plurality of buckle holes and a plurality of charm retaining holes. The plurality of charm retaining holes are positioned between the buckle and the plurality of buckle holes. The animal collar further comprises one or more charms that can be secured into one or more of the charm retaining holes.

Additional shortcomings of the prior art are overcome and additional advantages are provided through the provision of an animal collar that is personalizable with charms. The animal collar can comprise a buckle, a mesh material, and an elastomer strap that is formed around and encapsulates the mesh material. The elastomer strap attaches to the buckle. The elastomer strap can have a plurality of buckle holes and a plurality of charm retaining holes. The plurality of charm retaining holes are positioned between the buckle and the plurality of buckle holes.

The animal collar further comprises a gripping texture that is integrally formed on the surface of the elastomer strap and one or more charms that can be secured into one or more of the charm retaining holes. The charm comprises an emblem, a first charm fastener side having a charm threaded portion, and a second charm fastener side having a charm threaded insert portion and a charm collar that is sized to fit through the charm retaining hole. A charm outer perimeter ring on each of the first charm fastener side and the second charm fastener side is sized slightly larger than the charm retaining hole. The emblem is affixed to either the first charm fastener side or the second charm fastener side.

The animal collar can further comprise one or more plugs. Plug can be fitted into the charm retaining hole, in a removable manner. Each of the outer perimeter ring can comprise an interior edge that is flat and perpendicular to the collar creating a moisture-resistant seal between the plug and the elastomer band when inserted into the charm retaining hole. Each of the outer perimeter ring comprise a beveled perimeter edge creating a smooth transition between the top and bottom surface of the elastomer band and the top and bottom surface of the plug.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 2-16 illustrate examples of an animal collar that is personalizable with charms;

The detailed description explains the preferred embodiments of the invention, together with advantages and features, by way of example with reference to the drawings.

DETAILED DESCRIPTION OF THE INVENTION

Figure 1:
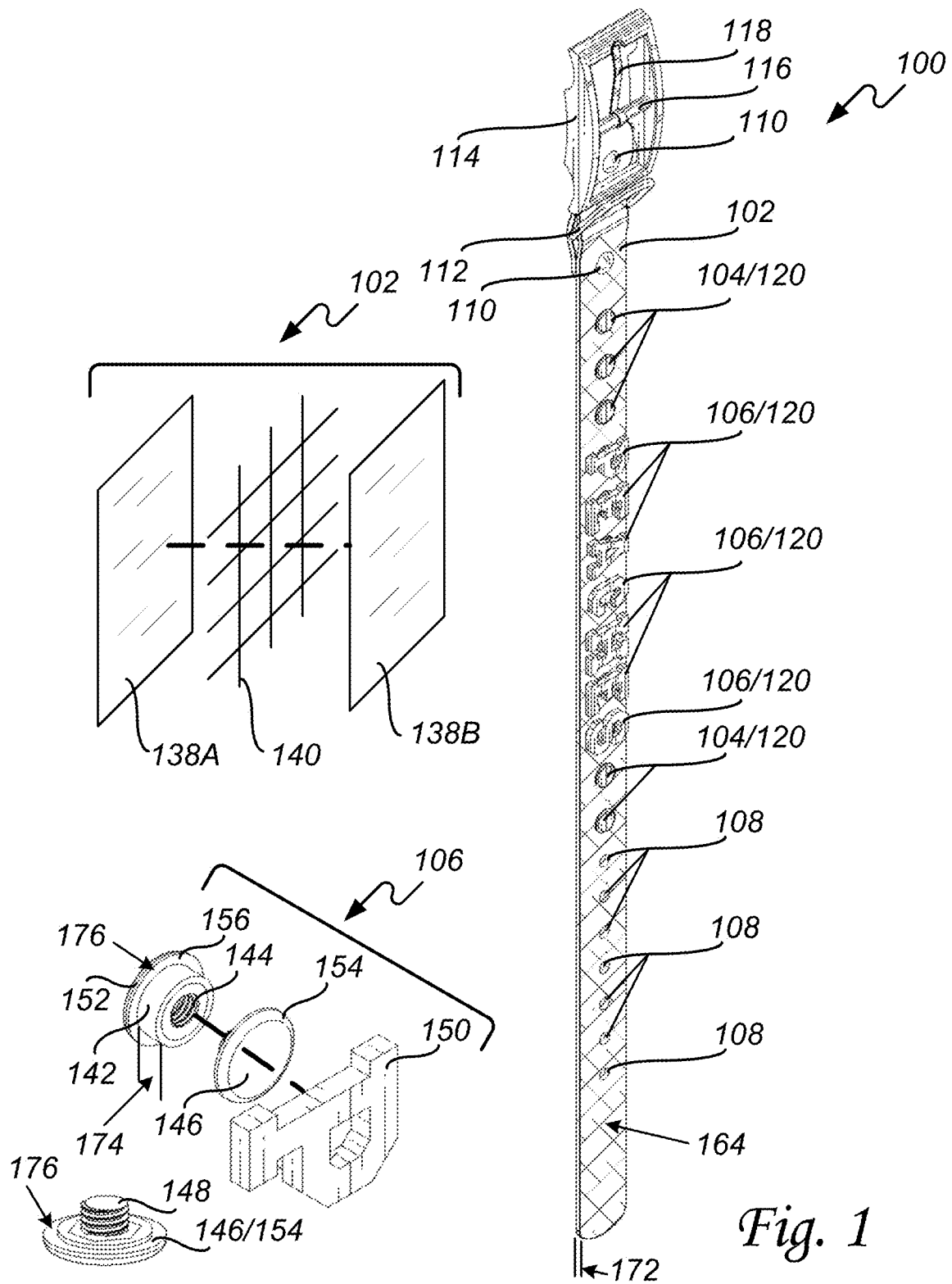
FIG. 1 illustrates one example of an animal collar that is personalizable with charms, including certain assembly views.

Turning now to the drawings in greater detail, it will be seen that in FIG. 1 there is illustrated one example of an animal collar 100 that is personalizable with charms 106, including certain assembly views. In an exemplary embodiment, the animal collar 100 can comprise a buckle 114, a mesh material 140, and an elastomer strap 102 that is formed around or otherwise encapsulates with an elastomer material 138A-138B the mesh material 140 forming the strap 102.

The elastomer strap 102 attaches to buckle 114 at one end and the elastomer strap 102 has a plurality of buckle holes 108 at the other end. In an exemplary embodiment, the elastomer strap 102 can be wrapped around a portion of the buckle 114 and secured to itself such as by fastener 110. Such fastener 110 can be rivets or other suitable fasteners.

In an exemplary embodiment, a strap retaining ring 112 can be secured to the elastomer strap proximate to the buckle 114. Such securing can be done by wrapping the elastomer strap 102 along both sides of a portion of the strap retaining ring 112 and placing fasteners 110 through the elastomer strap 102 on each side of the portion of the strap retaining ring 112 as illustrated in at least FIG. 1.

The elastomer strap 102 also has a plurality of charm retaining holes 120 through which the charm 106 or the plug 104 can be secured. In this regard, the animal collar 100 can further comprise one or more of plug 104. The plug 104 fits into the charm retaining holes 120, in a removable manner.

In operation, mesh material 140 provides structural strength preventing the animal collar 100 elastomer band 102 from elongating during use. Such use can include walking an animal that is pulling against a leash that is attached to the animal collar 100 or other types and kinds of uses and stresses, as may be required and/or desired in a particular embodiment. In an exemplary embodiment, mesh 140 can have a tensile strength greater than 10 pounds per square inch. In another exemplary embodiment, mesh 140 can be selected to have different tensile strengths.

In an exemplary embodiment, the plurality of charm retaining holes 120 can be positioned between buckle 114 and the plurality of buckle holes 108.

In an exemplary embodiment, one or more of the charms 106 can be secured into one or more of the charm retaining holes 104, as may be required and/or desired in a particular embodiment and desired by a user.

In an exemplary embodiment, the charm 106 can comprise an emblem 150, a first charm fastener side 146 that has a charm threaded portion 148, and a second charm fastener side 156 that has a charm threaded insert 144 portion that interconnects with the threaded portion 148 (screwing together) and a charm collar 142 that can be sized to fit through the charm retaining hole 120. A charm outer perimeter ring 152/154 on each of the first charm fastener side 146 (ring 154) and the second charm fastener side 156 (ring 152) can be sized slightly larger than the charm retaining hole 120 to grip the edge of the charm retaining hole 120 holding the charm 106 in place. Emblem 150 can be affixed to either the first charm fastener side 146 or the second charm fastener side 156.

In an exemplary embodiment, the charm interior edges 176 of first charm fastener side 146 and the second charm fastener side 156 can be flat and perpendicular to the collar 142 when assembled. In this regard, when charm 106 is inserted into the charm retaining hole 120 the charm interior edge 176 can be in contact with the top and bottom surface of the elastomer band 102 creating a moisture-resistant seal between the charm 106 and the elastomer band that prevents liquids, user sweat, moisture, and other liquids from ingress into the charm retaining hole 120.

In an exemplary embodiment, the thickness 174 of the charm collar 142 can be slightly less than the thickness 172 of the elastomer band 102, creating a snug fit that prevents the charm 106 from rotating within the charm retaining holes 120.

In an exemplary embodiment, charms 106 can be placed in some or all of the charm retaining holes 120, and plugs 104 can be used to fill the remaining charm retaining holes 120. Such charms 106 can be letter shapes, number shapes, character shapes, logos, team logos, indicia shapes, or other types and or kinds of charms, without particular limitation, as may be required and/or desired in a particular embodiment. In an exemplary embodiment, the plugs 104 can be different colors. One example, and not a limitation, is the letters "P E A C H E S" illustrated in at least FIG. 1.

In an exemplary embodiment, a gripping texture 164 can be integrally formed on the surface of the elastomer strap 102. Such gripping surface 164 can be integrally formed on the front surface, back surface, or both front and back surfaces, of the elastomer strap 102, as may be required and/or desired in a particular embodiment.

In operation, a user can decorate the animal color 100 by placing various charms 106 and plugs 104 in the charm retaining holes 120. The collar 100 can then be looped around an animal's neck and the buckle latch 118 which is affixed, in a movable manner, at one end to the latch support 116 can be engaged with one of the buckle holes 108 to secure the collar 100 around the animal's neck.

Figure 2:
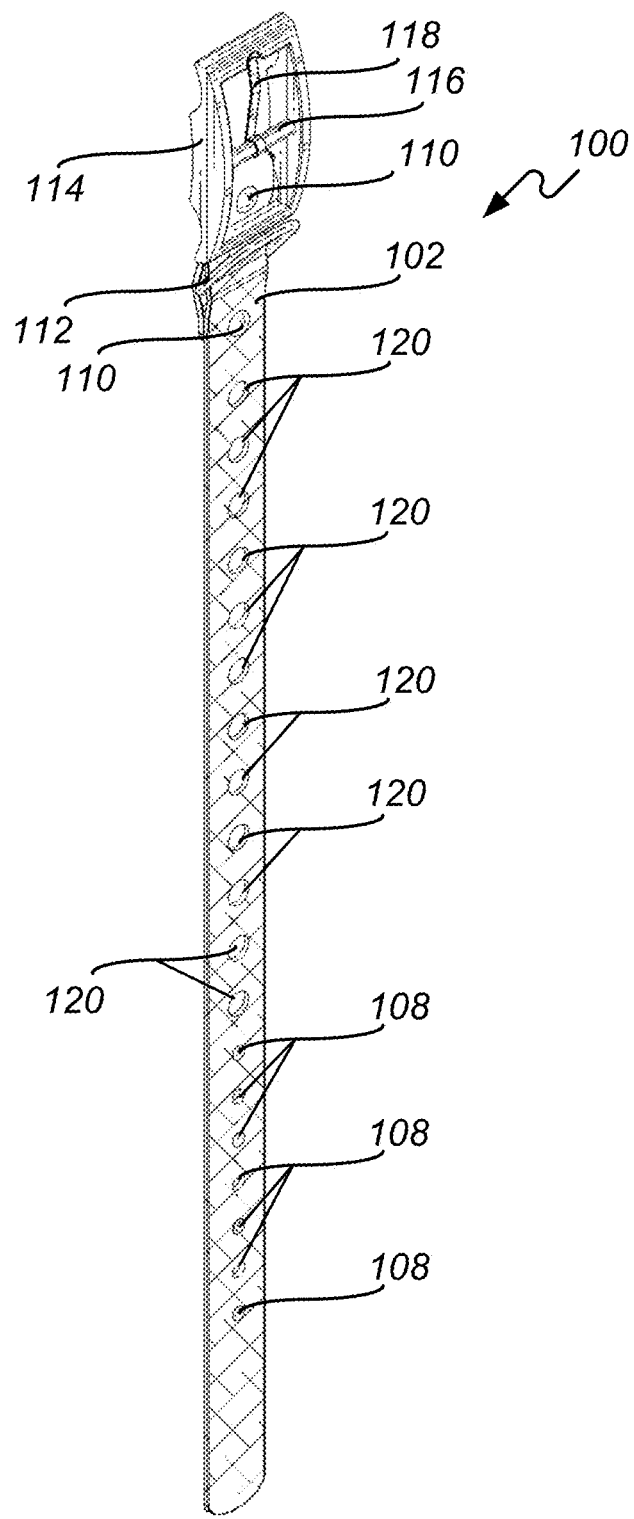

Referring to FIG. 2, there is illustrated a perspective view of an animal collar 100 that is personalizable with charms. In this embodiment, the plugs 104 and charms 106 are absent revealing the empty charm retaining holes 120.

Figure 3:
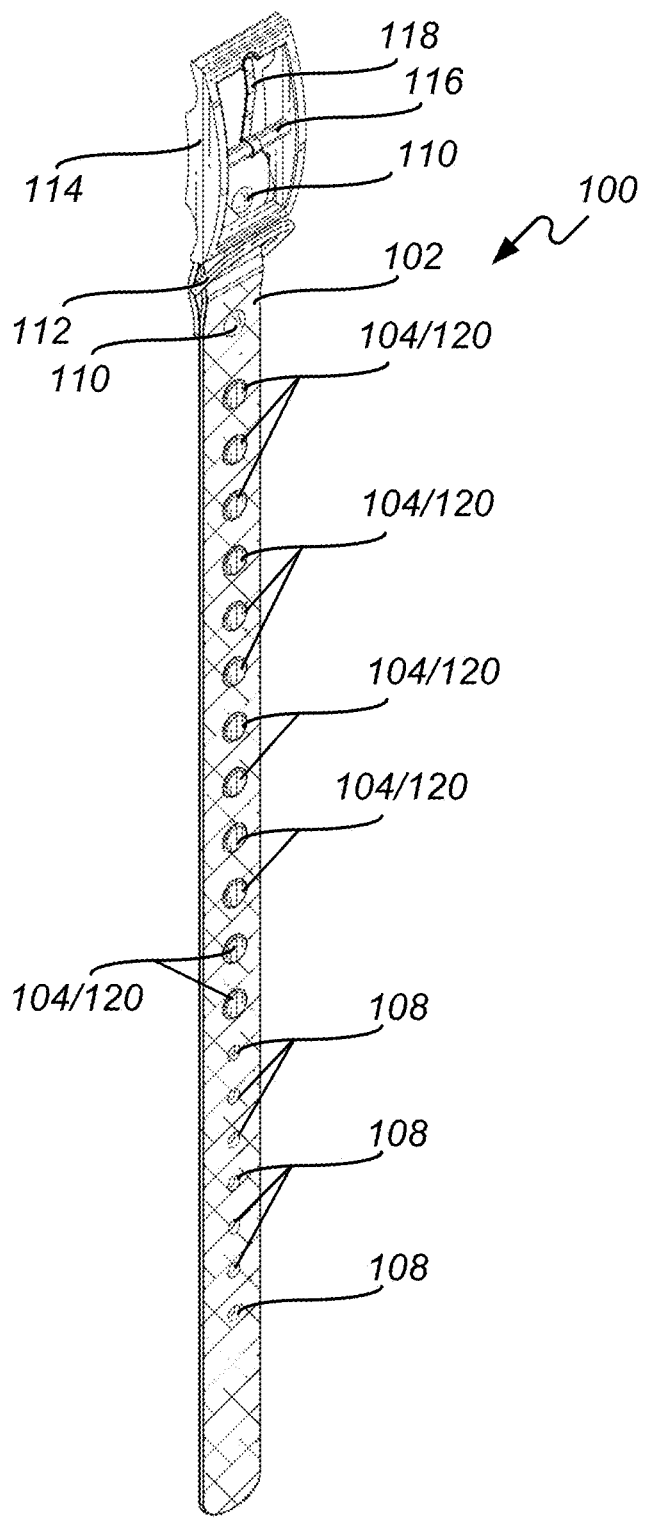

Referring to FIG. 3, there is illustrated a perspective view of an animal collar 100 that is personalizable with charms. In this embodiment, the plugs 104 are present, filling each of the charm retaining holes 120.

Referring to FIG. 4, there is illustrated a front view of an animal collar 100 that is personalizable with charms. In this embodiment, the plugs 104 and charms 106 are absent revealing the empty charm retaining holes 120.

Referring to FIG. 5, there is illustrated a back view of an animal collar 100 that is personalizable with charms. In this embodiment, the plugs 104 and charms 106 are absent revealing the empty charm retaining holes 120.

Figures 6, 7:
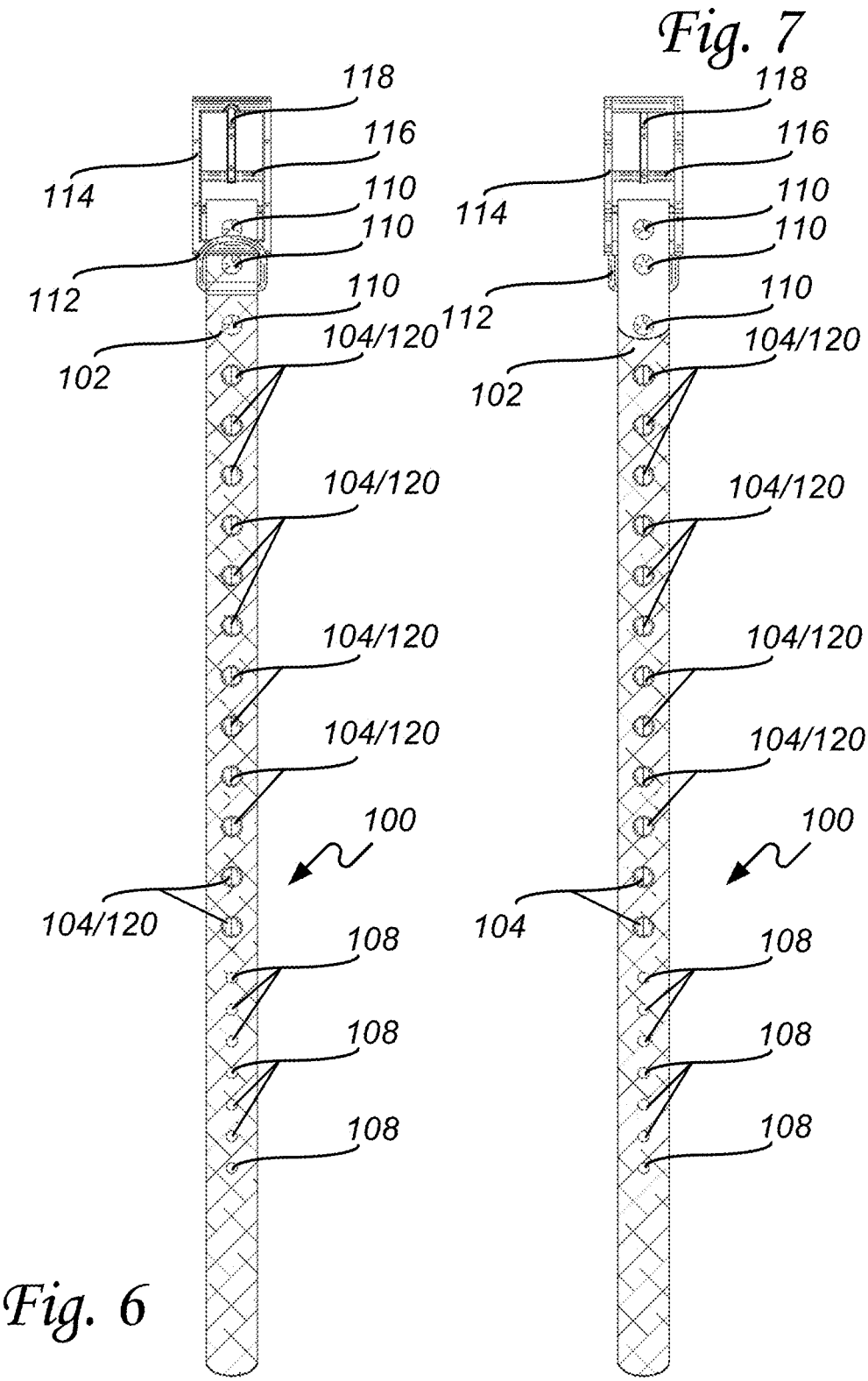

Referring to FIG. 6, there is illustrated a front view of an animal collar 100 that is personalizable with charms. In this embodiment, the plugs 104 are present, filling each of the charm retaining holes 120.

Referring to FIG. 7, there is illustrated a back view of an animal collar 100 that is personalizable with charms. In this embodiment, the plugs 104 are present, filling each of the charm retaining holes 120.

Figures 8, 9:
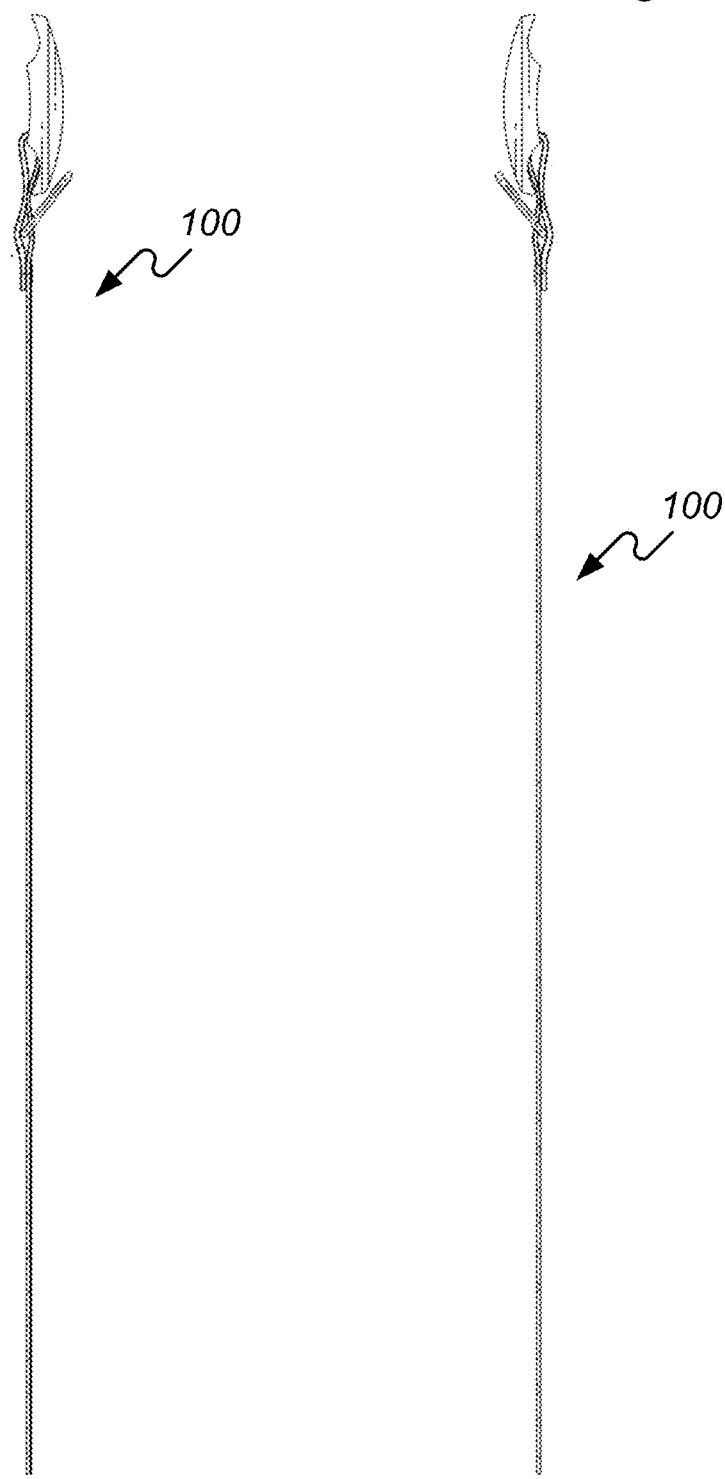

Referring to FIG. 8, there is illustrated a left side view of an animal collar 100 that is personalizable with charms. In this embodiment, the plugs 104 and charms 106 are absent revealing the empty charm retaining holes 120.

Referring to FIG. 9, there is illustrated a right side view of an animal collar 100 that is personalizable with charms. In this embodiment, the plugs 104 and charms 106 are absent revealing the empty charm retaining holes 120.

Figure 10:
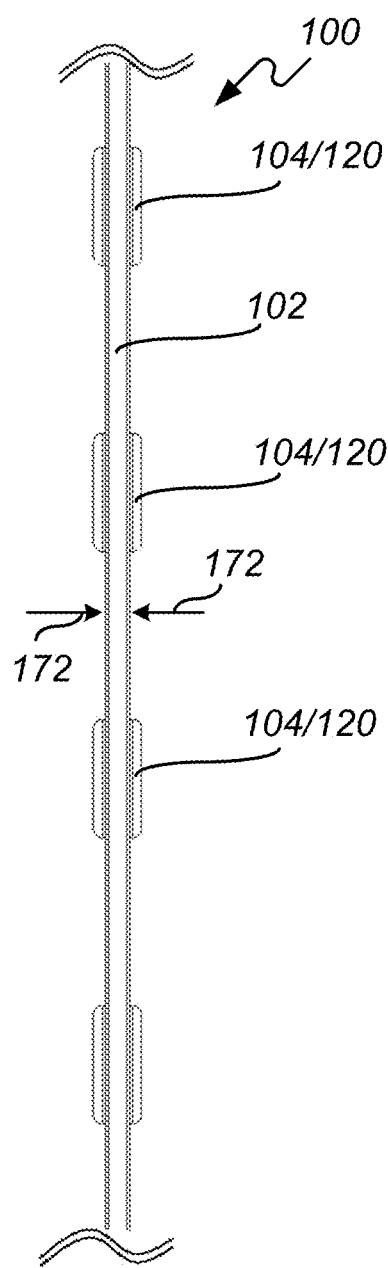

Referring to FIG. 10, there is illustrated a side view of an animal collar 100 that is personalizable with charms. In this embodiment, the plugs 104 are present, filling each of the charm retaining holes 120.

Figure 11:
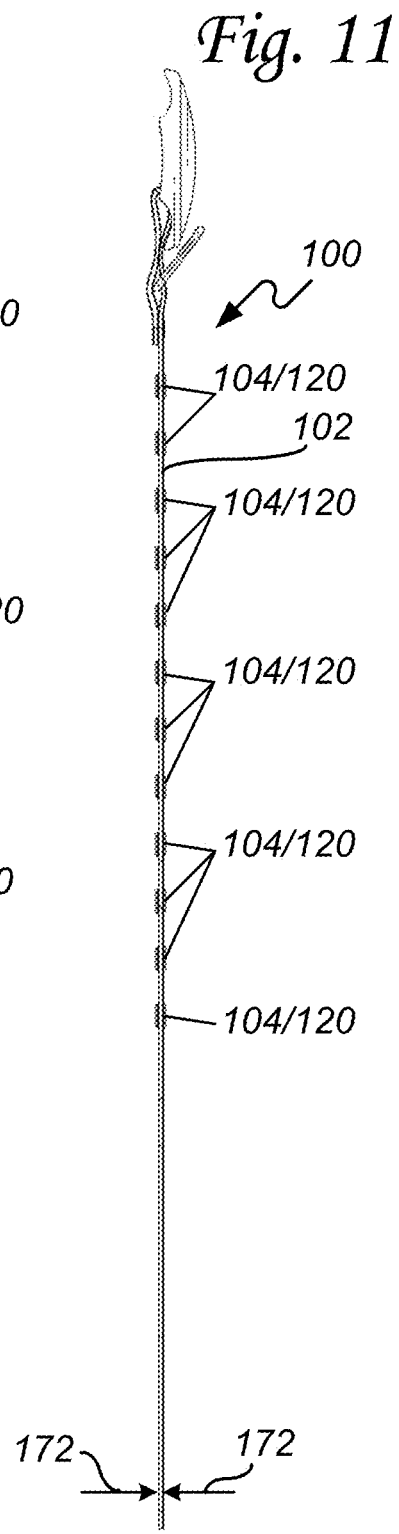

Referring to FIG. 11, there is illustrated a left side view of an animal collar 100 that is personalizable with charms. In this embodiment, the plugs 104 are present, filling each of the charm retaining holes 120.

Figure 12:
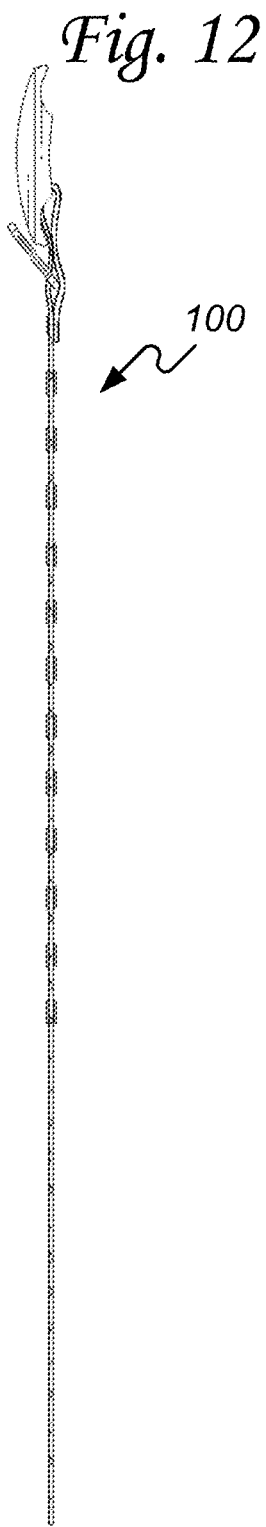

Referring to FIG. 12, there is illustrated a right side view of an animal collar 100 that is personalizable with charms. In this embodiment, the plugs 104 are present, filling each of the charm retaining holes 120.

Figure 13:
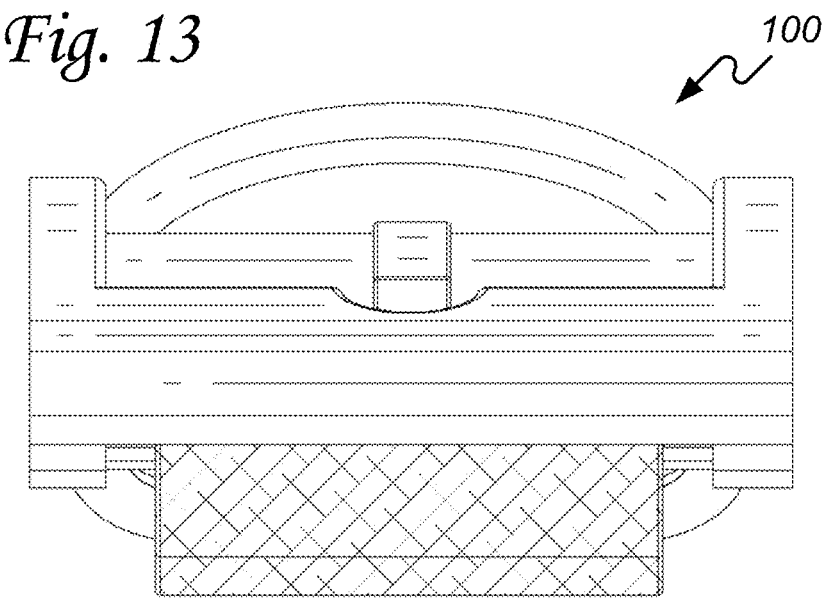

Referring to FIG. 13, there is illustrated a top view of an animal collar 100 that is personalizable with charms. In this embodiment, the plugs 104 and charms 106 are absent revealing the empty charm retaining holes 120.

Figure 14:
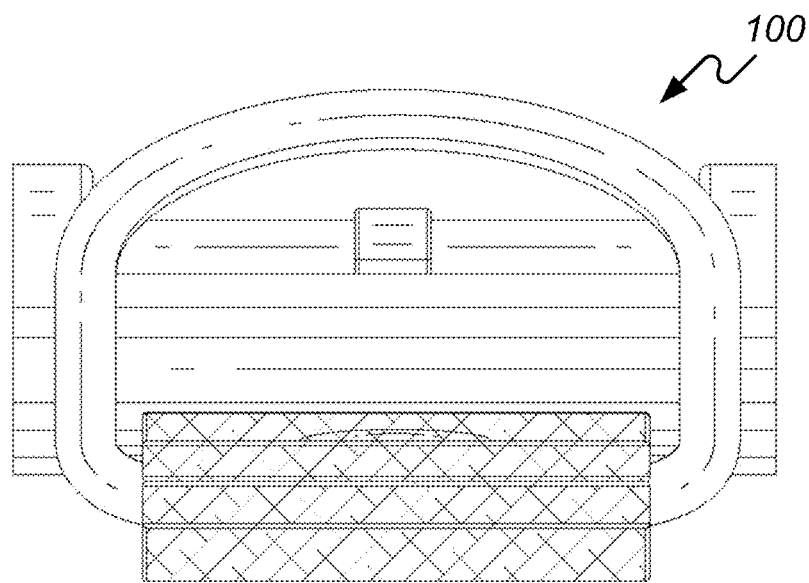

Referring to FIG. 14, there is illustrated a bottom view of an animal collar 100 that is personalizable with charms. In this embodiment, the plugs 104 and charms 106 are absent revealing the empty charm retaining holes 120.

Referring to FIG. 15, there is illustrated a top view of an animal collar 100 that is personalizable with charms. In this embodiment, the plugs 104 are present, filling each of the charm retaining holes 120.

Referring to FIG. 16, there is illustrated a bottom view of an animal collar 100 that is personalizable with charms. In this embodiment, the plugs 104 are present, filling each of the charm retaining holes 120.

Figure 17:
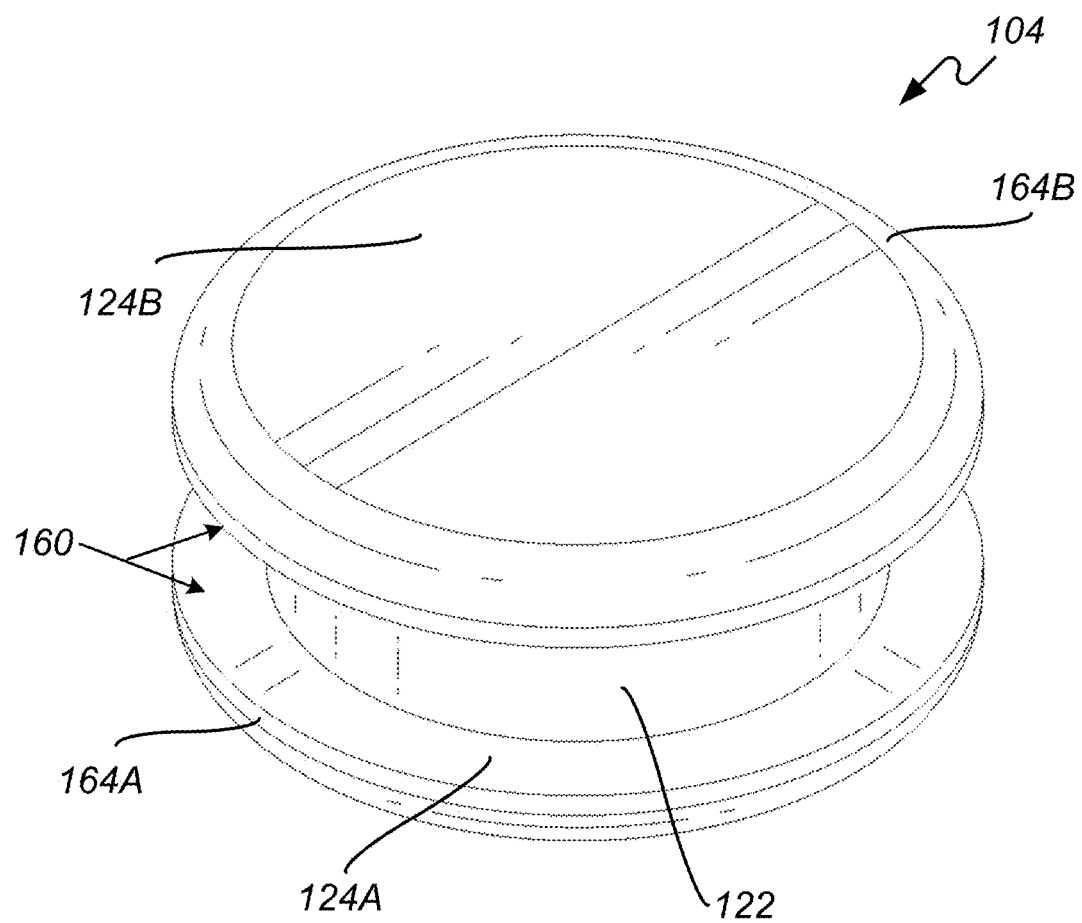
FIGS. 17-19 illustrate examples of a plug that is flexible.
Figure 18:
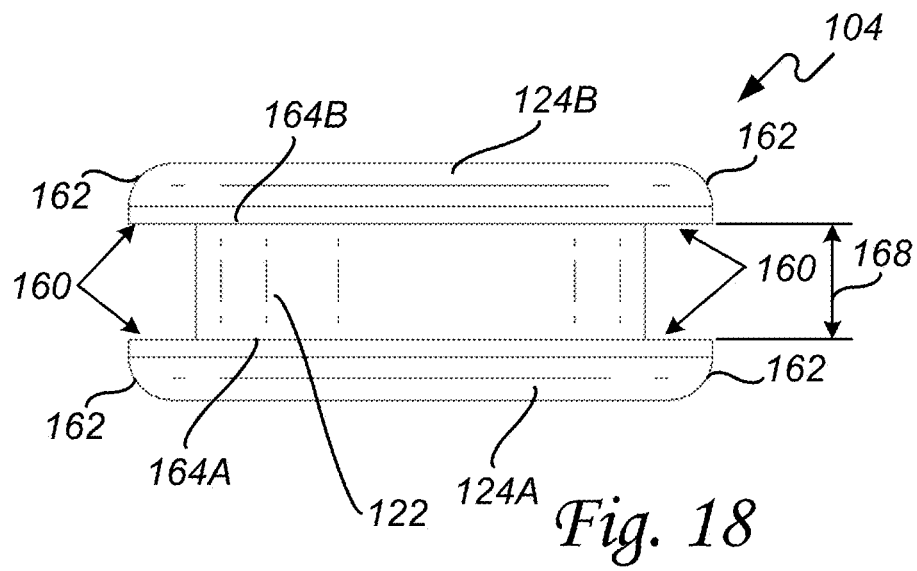
Figure 19:
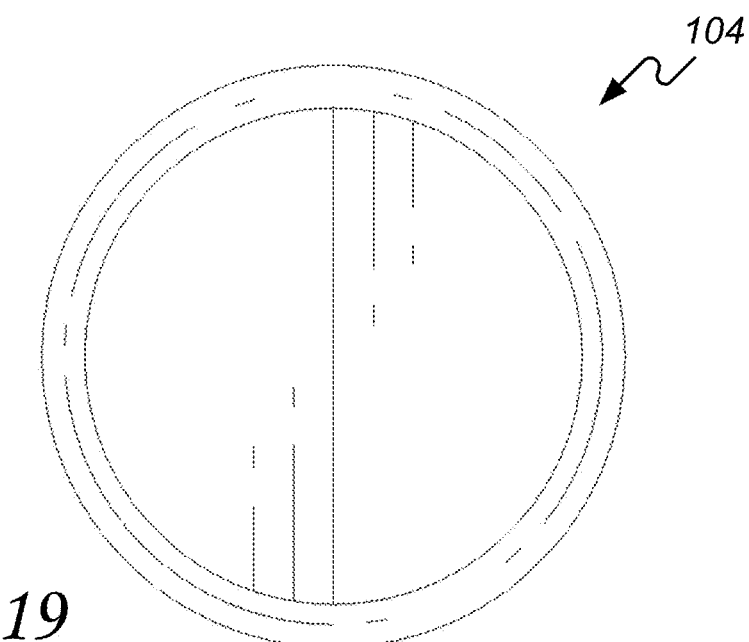

Referring to FIG. 17, there is illustrated a perspective view of plug 104 that is flexible. Referring to FIG. 18, there is illustrated a front, back, left, and right view (all the same) of a plug 104 that is flexible. Referring to FIG. 19, there is illustrated a top and bottom view (both the same) of a plug 104 that is flexible. In an exemplary embodiment, plug 104 can be made from a flexible material such as rubber, polymer, or other suitable material that allows a user to press plug 104 into one or more of the charm retaining holes 120.

In this regard, plug 104 can comprise a collar 122 that is sized slightly smaller than the charm retaining hole 120 and an outer perimeter ring 164A and 164B on each end of plug 104 that is sized slightly larger than the charm retaining hole 120 to grip the edge of the charm retaining hole 120 holding the plug 104. In operation, each of the plugs 104 can be flexed and inserted, in a removable manner, into the charm retaining holes 120.

In an exemplary embodiment, the thickness 168/170 of collar 122 is slightly less than the thickness 172 of the elastomer band 102, creating a snug fit that prevents the plug 104 from rotating within the charm retaining holes 120.

In an exemplary embodiment, the interior edge 160 of the plug 104 can be flat and perpendicular to the collar 122. In this regard, when plug 104 is inserted into the charm retaining hole 120 the interior edge 160 is in contact with the top and bottom surface of the elastomer band 102 creating a moisture-resistant seal between plug 104 and the elastomer band 102 that prevents liquids, user sweat, moisture, and other liquids from ingress into the charm retaining hole 120.

In an exemplary embodiment, the outer perimeter ring 164A and 164B are beveled perimeter edge 162 creating a smooth transition between the top and bottom surface of the elastomer band 102 and the top and bottom plug surface 124A and 124B. This aids in mitigating the snagging of animal hair, other collars, and other things that slide along the surface of the animal collar 100 surfaces.

Figure 20:
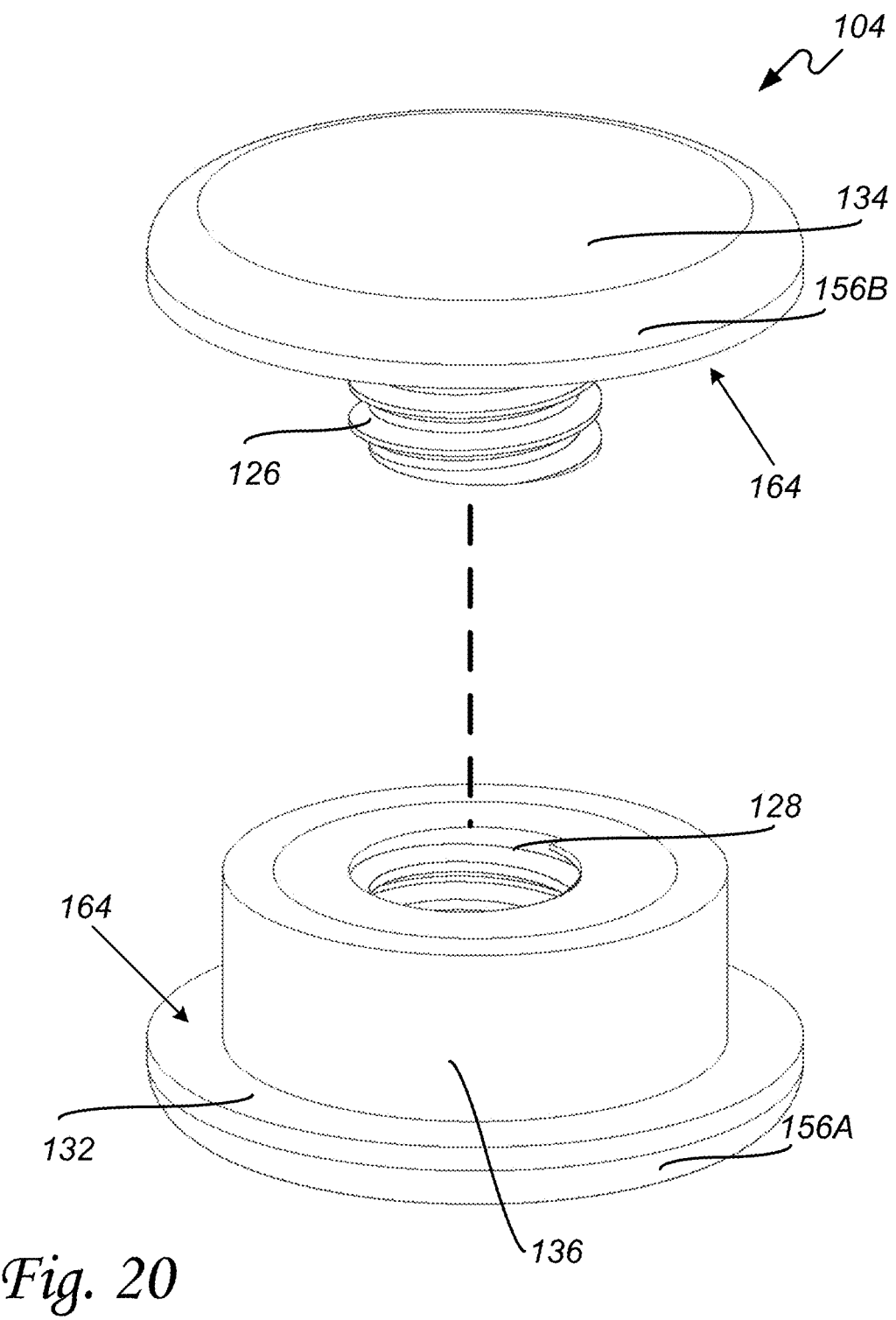
FIGS. 20-24 illustrate examples of a plug that screws together.
Figure 21:
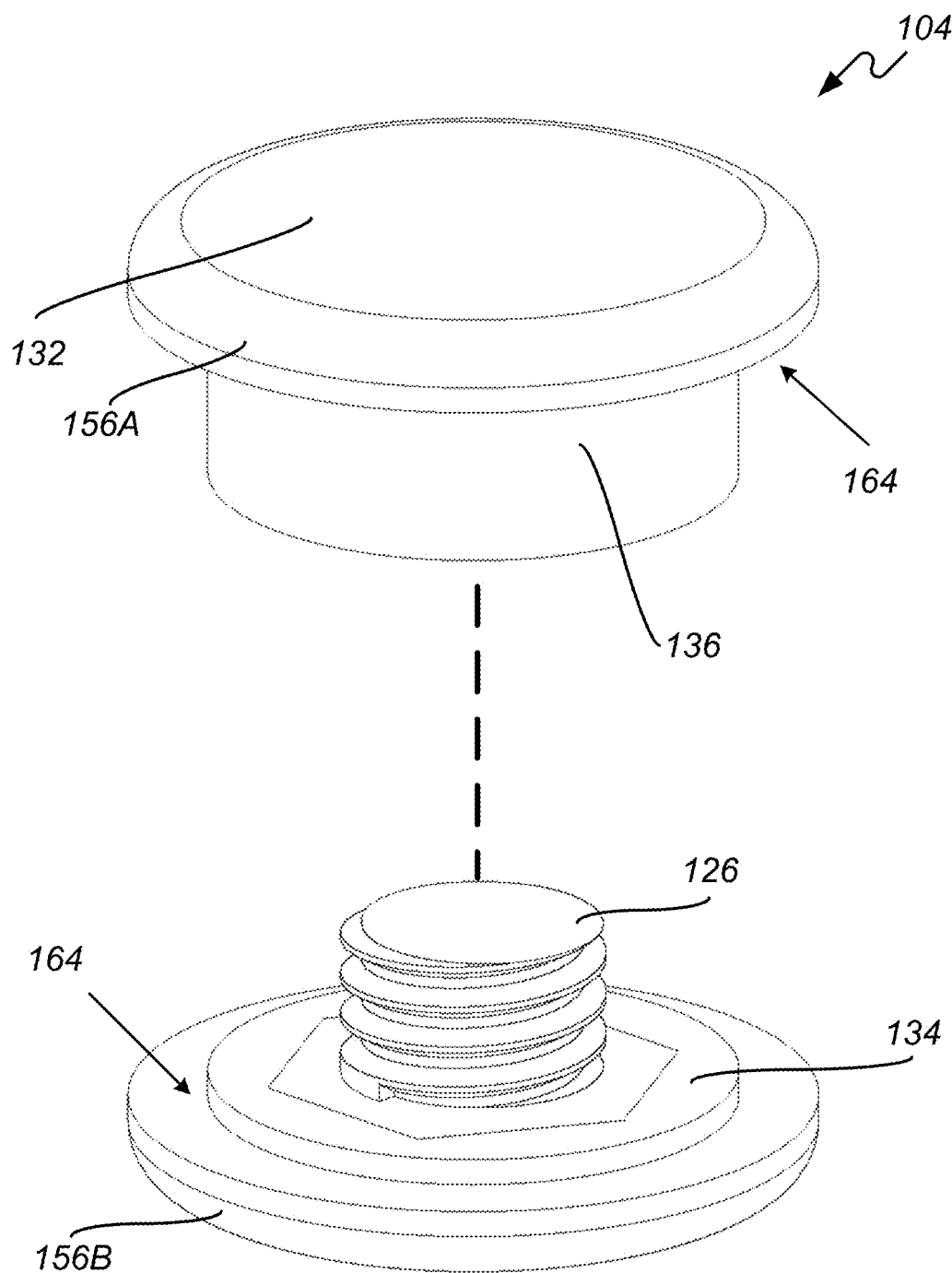
Figure 22:
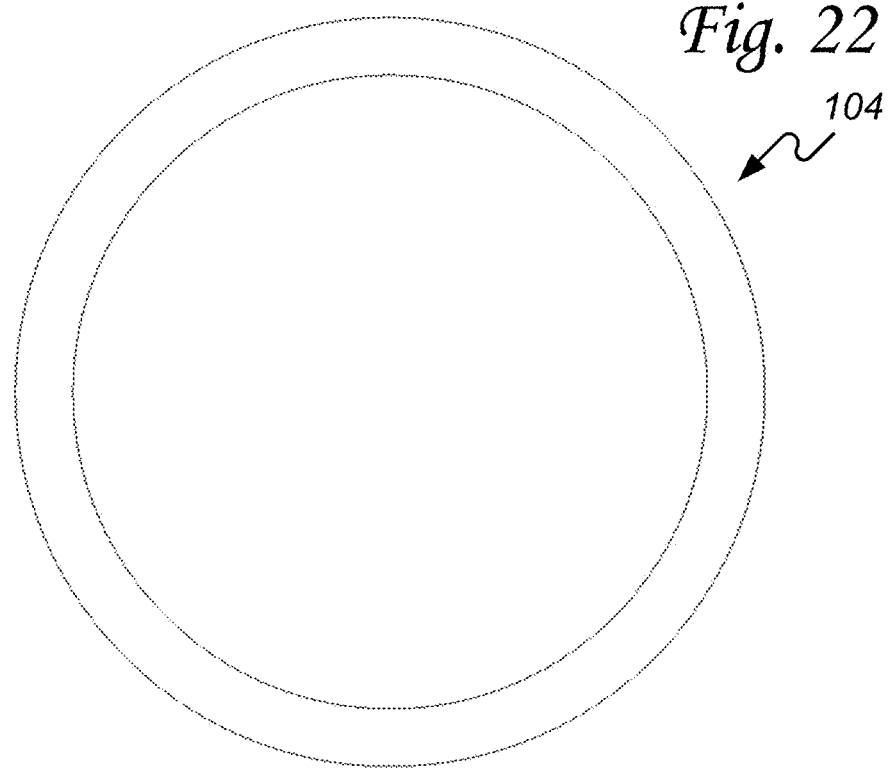
Figure 23:
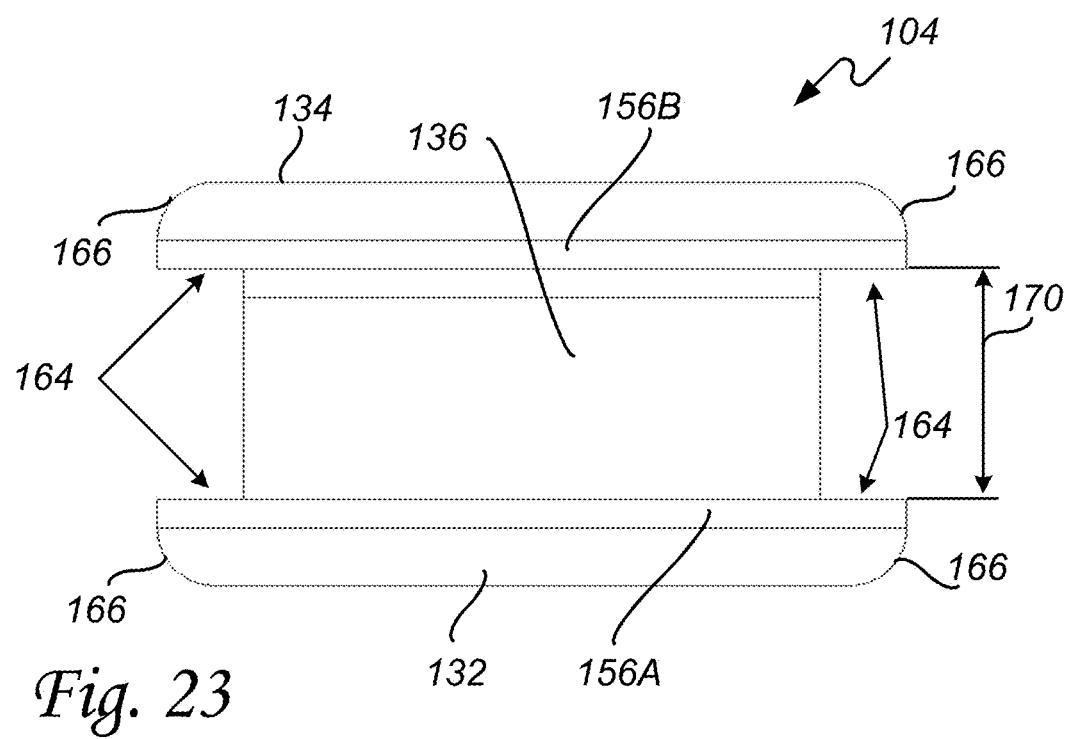
Figure 24:
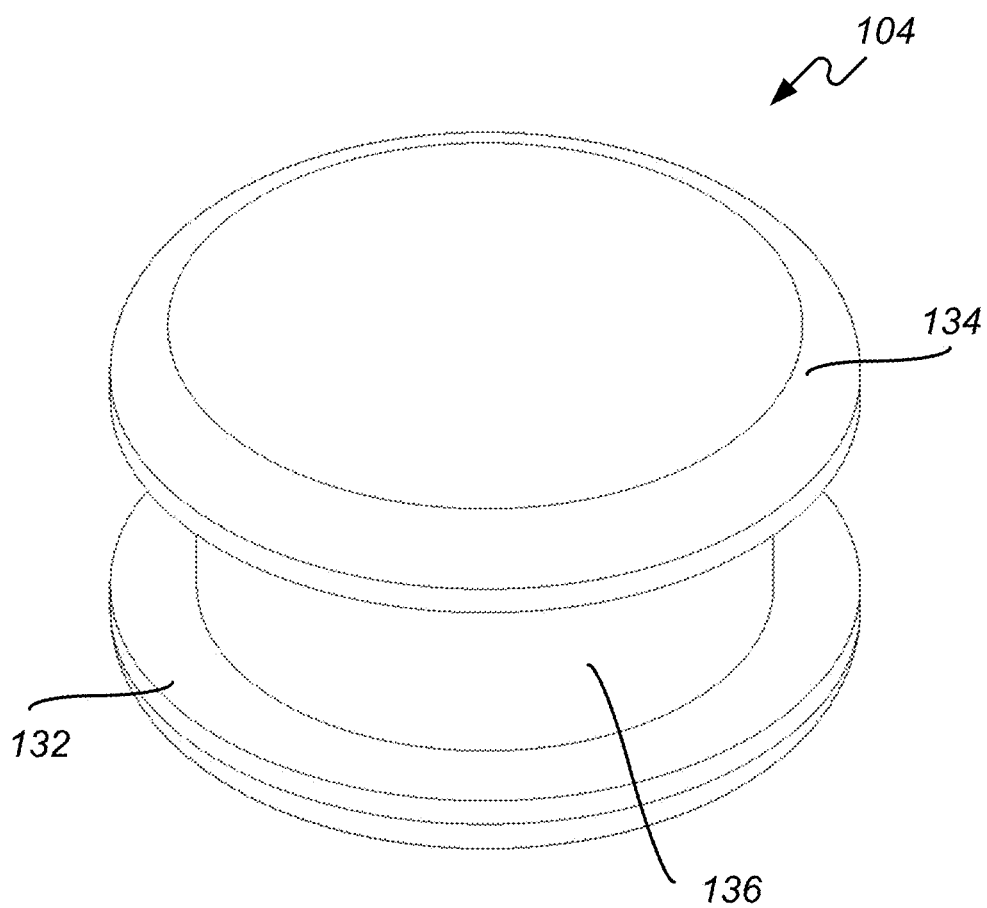

Referring to FIGS. 20 and 21, there is illustrated one example of an assembly view of a plug 104 that screws together. Referring to FIG. 22, there is illustrated one example of a top and bottom view (both the same) of a plug 104 that screws together. Referring to FIG. 23, there is illustrated a front, back, left, and right view (all the same) of a plug 104 that screws together. Referring to FIG. 24, there is illustrated perspective view of a plug 104 that screws or otherwise fastens together.

In an exemplary embodiment, the plug 104 can be formed as a first side 134 which comprises a threaded portion 126, a second side 132 which comprises a threaded insert portion 128, and a collar 136 that is sized to fit through the charm retaining hole 120, an outer perimeter ring 156A/156B on each of the first side 134 and the second side 132 is sized slightly larger than the charm retaining hole 120 to grip the edge of the charm retaining hole 120 holding the charm 106 in place. In operation, each of the plugs 104 can be inserted, in a removable manner, into one or more of the charm retaining holes 120, and the threaded portion 126 screws or otherwise fastens together with the threaded insert portion 128 to secure the plug within the charm retaining hole 120.

In this regard, plug 104 can comprise a collar 136 that is sized slightly smaller than the charm retaining hole 120 and an outer perimeter ring 156A and 156B on each end of plug 104 that is sized slightly larger than the charm retaining hole 120 to grip the edge of the charm retaining hole 120 holding the plug 104 in place. In operation, each of the plugs 104 can be flexed and inserted, in a removable manner, into the charm retaining holes 120.

In an exemplary embodiment, the thickness 168/170 of collar 122 is slightly less than the thickness 172 of the elastomer band 102, creating a snug fit that prevents the plug 104 from rotating within the charm retaining holes 120.

In an exemplary embodiment, the outer ring can comprise an interior edge 160. The interior edge of the plug 104 can be flat and perpendicular to the collar 122. In this regard, when plug 104 is inserted into the charm retaining hole 120 the interior edge 160 is in contact with the top and bottom surface of the elastomer band 102 creating a moisture-resistant seal between plug 104 and the elastomer band 102 that prevents liquids, user sweat, moisture, and other liquids from ingress into the charm retaining hole 120.

In an exemplary embodiment, the outer perimeter ring 164A and 164B are beveled perimeter edge 162 creating a smooth transition between the top and bottom surface of the elastomer band 102 and the top and bottom plug surface 124A and 124B. This aids in mitigating the snagging of animal hair, other collars, and other things that slide along the surface of the animal collar 100 surfaces.

In an exemplary embodiment, an animal collar 100 that is personalizable with charms 106 can comprise a buckle 114, a mesh material 140, and an elastomer strap 102 that is formed around and encapsulates the mesh material 140. The elastomer strap 102 attaches to the buckle 114. The elastomer strap 102 has a plurality of buckle holes 108 and a plurality of charm retaining holes 120. The plurality of charm retaining holes 120 are positioned between buckle 114 and the plurality of buckle holes 108. The animal collar 100 further comprises one or more of a charm 106 that is secured into one or more of the charm retaining holes 120.

In an exemplary embodiment, one or more plug 104 can be fitted into the charm retaining holes 120, in a removable manner. The plug 104 can be a single piece of flexible material as illustrated in at least FIGS. 17-19 or more than one piece that fastens together to form the plug 104 as illustrated in at least FIGS. 20-24.

In an exemplary embodiment, plug 104 can comprise a collar 122/136 that can be sized slightly smaller than the charm retaining hole 120 and an outer perimeter ring 156/164 on each end of plug 104 that is sized slightly larger than the charm retaining hole 120 to grip the edge of the charm retaining hole 120 holding the plug 104 in place. Each of the outer perimeter ring 156/164 can comprise an interior edge 160/164 that is flat and perpendicular to the collar 122/136 creating a moisture-resistant seal between the charm 106 and the elastomer band 102 when inserted into the charm retaining hole 120. Each of the outer perimeter rings 156/164 can comprise a beveled perimeter edge 162/166 creating a smooth transition between the top and bottom surface of the elastomer band 102 and the top and bottom surface of the plug 104.

In addition, the plug 104 can be formed as a first side 134 which comprises a threaded portion 126, a second side 132 which comprises a threaded insert portion 128, and a collar 136 that is sized to fit through the charm retaining hole 120. In operation, the threaded portion 126 screws together with the threaded insert portion 136 to secure the plug 104 within the charm retaining hole 120.

In an exemplary embodiment, the charm 106 can comprise an emblem 150, a first charm fastener side 146 having a charm threaded portion 148, a second charm fastener side 126 having a charm threaded insert portion 144, and a charm collar 142 that is sized to fit through the charm retaining hole 120. A charm outer perimeter ring 152/154 on each of the first charm fastener side 146 and the second charm fastener side 156 can be sized slightly larger than the charm retaining hole 120 to grip the edge of the charm retaining hole 120 holding the charm 106 in place. The emblem can be affixed to either the first charm fastener side 146 or the second charm fastener side 156.

In an exemplary embodiment, the charm interior edge 176 of the first charm fastener side 146 and the second charm fastener side 156 can be flat and perpendicular to the collar 122142 when assembled. In this regard, when charm 106 is inserted into the charm retaining hole 120 the charm interior edge 176 can be in contact with the top and bottom surface of the elastomer band 102 creating a moisture-resistant seal between the charm 106 and the elastomer band 102 that prevents liquids, user sweat, moisture, and other liquids from ingress into the charm retaining hole 120.

In another exemplary embodiment, the animal collar 100 can comprise a buckle, a mesh material, and an elastomer strap 102 that is formed around and encapsulates the mesh material. The elastomer strap 102 attaches to the buckle 114. The elastomer strap 102 can have a plurality of buckle holes 108 and a plurality of charm retaining holes 120. The plurality of charm retaining holes 120 can be positioned between buckle 114 and the plurality of buckle holes 108.

The animal collar can further comprise a gripping texture 164 that is integrally formed on the surface of the elastomer strap 102, and one or more charms 106 that can be secured into one or more of the charm retaining holes 120. The charm 106 comprises an emblem 150, a first charm fastener side 146 that has a charm threaded portion 148, a second charm fastener side 156 that has a charm threaded insert portion 144, and a charm collar 142 that is sized to fit through the charm retaining hole 120. A charm outer perimeter ring 152/154 on each of the first charm fastener side 146 and the second charm fastener side 156 is sized slightly larger than the charm retaining hole 120 to grip the edge of the charm retaining hole 120 holding the charm 106 in place. The emblem can be affixed to either the first charm fastener side 146 or the second charm fastener side 156.

The animal collar can further comprise one or more plugs 104. The plug 104 fits into the charm retaining hole 120, in a removable manner. Each of the outer perimeter ring 156A-156B/164A-164B can comprise an interior edge 160/164 that is flat and perpendicular to the collar 122/136 creating a moisture-resistant seal when inserted into the charm retaining hole 120. Each of the outer perimeter rings 156A-156B/164A-164B can comprise a beveled perimeter edge 162/166 creating a smooth transition between the top and bottom surface of the elastomer band 102 and the top and bottom surface of the plug 104.

Figure 25:
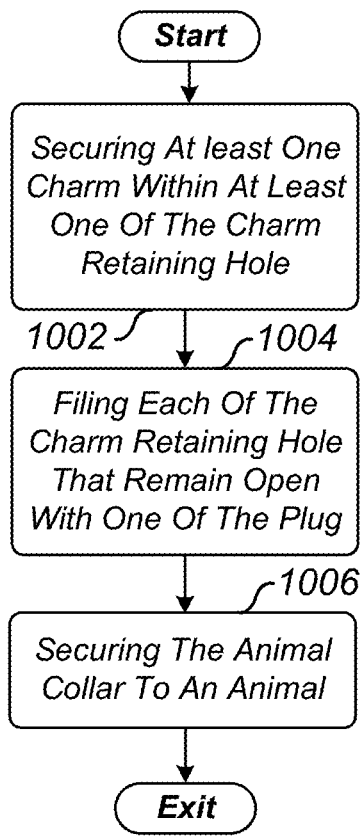
FIG. 25 illustrates one example of a method of using an animal collar that is personalizable with charms.

Referring to FIG. 25, there is illustrated one example of a method of using an animal collar that is personalizable with charms. In an exemplary embodiment, the method begins in step 1002 by securing at least one charm within at least one of the plurality of charm retaining holes, and in step 1004 by filling each of the plurality of charm retaining holes that remain open with one of the plugs, and in step 1006 by securing the animal collar to an animal.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. An animal collar that is personalizable with charms, the animal collar comprising:
 a buckle;
 a mesh material;
 a single-layer elastomer strap is formed around and encapsulates the mesh material, the mesh material is configured to restrict elongation and increase the tensile strength of the single-layer elastomer strap, the elastomer strap attaches to the buckle, the elastomer strap having a plurality of buckle holes and more than one of a charm retaining hole;
 a gripping texture is integrally formed on the surface of the single-layer elastomer strap, the gripping texture provides raised or recessed reliefs along the surface of the single-layer elastomer strap absent of creating an additional layer;
 at least one of a charm is secured into one or more of the charm retaining hole, the charm comprises an emblem, a first charm fastener side that is sized slightly larger than the charm retaining hole having a charm threaded portion and a first charm fastener beveled edge along the outer perimeter circumference, and a second charm fastener side that is sized slightly larger than the charm retaining hole having a charm threaded insert portion and a second charm fastener beveled edge along the outer perimeter circumference, each of the first charm fastener beveled edge and the second charm fastener beveled edge creates a smooth transition between the single-layer elastomer strap and each of the first charm fastener side and the second charm fastener side mitigating snagging on animal hair, the charm threaded portion and the charm threaded insert portion fasten together through the charm retaining hole, pulling the first charm fastener side and the second charm fastener side together against the single-layer elastomer strap creating a first moisture-resistant seal between the charm and the top and bottom surfaces of the single-layer elastomer strap, the emblem is affixed to either the first charm fastener side or the second charm fastener side; and at least one of a flexible plug is formed as a single piece of flexible material, the plug comprises a top plug surface that is sized larger than the charm retaining hole and having a first flexible plug beveled edge along the outer perimeter circumference, a bottom side surface that is sized larger than the charm retaining hole and having a second flexible plug beveled edge along the outer perimeter circumference, and a plug collar, each of the first flexible plug beveled edge and the second flexible plug beveled edge creates a smooth transition between the single-layer elastomer strap and each of the top plug surface and the bottom plug surface mitigating snagging on animal hair, the plug collar is sized to fit into the charm retaining hole and is connected at one end to the top side surface and at the other end to the bottom side surface, the flexible plug flexes to fit into the charm retaining hole, in a removable manner, pulling the top plug surface and the bottom plug surface against the single-layer elastomer strap creating a second moisture-resistant seal between the flexible plug and the top and bottom surfaces of the single-layer elastomer strap; wherein one of the flexible plug is fitted into each of the charm retaining hole that is absent a charm.

2. The animal collar in accordance with claim 1, wherein at least one of the emblem is a letter shape, a number shape, a character shape, a logo, a team logo, or an indicia shape.

3. The animal collar in accordance with claim 1, wherein the mesh material has a tensile strength greater than 10 pounds per square inch.

4. The animal collar in accordance with claim 1, each of the charm retaining hole is positioned between the buckle and the plurality of buckle holes.

5. The animal collar in accordance with claim 1, further comprising: a strap retaining ring is secured to the single-layer elastomer strap proximate to the buckle.

6. A method of using the animal collar of claim 1, the method comprising the steps of: securing at least one of the charm within at least one of the plurality of charm retaining hole; and securing the animal collar to an animal.

7. A method of using the animal collar of claim 1, the method comprising the steps of: securing at least one of the charm within at least one of the plurality of charm retaining hole; filling each of the plurality of charm retaining hole that remain open with one of the flexible plug; and securing the animal collar to an animal.

8. An animal collar that is personalizable with charms, the animal collar comprising:
   a buckle;
   a mesh material;
   a single-layer elastomer strap is formed around and encapsulates the mesh material, the mesh material is configured to restrict elongation and increase the tensile strength of the single-layer elastomer strap, the elastomer strap attaches to the buckle, the elastomer strap having a plurality of buckle holes and more than one of a charm retaining hole;
   a gripping texture is integrally formed on the surface of the single-layer elastomer strap, the gripping texture provides raised or recessed reliefs along the surface of the single-layer elastomer strap absent of creating an additional layer;
   at least one of a charm is secured into one or more of the charm retaining hole, the charm comprises an emblem, a first charm fastener side that is sized slightly larger than the charm retaining hole having a charm threaded portion and a first charm fastener beveled edge along the outer perimeter circumference, and a second charm fastener side that is sized slightly larger than the charm retaining hole having a charm threaded insert portion and a second charm fastener beveled edge along the outer perimeter circumference, each of the first charm fastener beveled edge and the second charm fastener beveled edge creates a smooth transition between the single-layer elastomer strap and each of the first charm fastener side and the second charm fastener side mitigating snagging on animal hair, the charm threaded portion and the charm threaded insert portion fasten together through the charm retaining hole, pulling the first charm fastener side and the second charm fastener side together against the single-layer elastomer strap creating a first moisture-resistant seal between the charm and the top and bottom surfaces of the single-layer elastomer strap, the emblem is affixed to either the first charm fastener side or the second charm fastener side; and
   at least one of a flexible plug is formed as a single piece of flexible material, the plug comprises a top plug surface that is sized larger than the charm retaining hole and having a first flexible plug beveled edge along the outer perimeter circumference, a bottom side surface that is sized larger than the charm retaining hole and having a second flexible plug beveled edge along the outer perimeter circumference, and a plug collar, each of the first flexible plug beveled edge and the second flexible plug beveled edge creates a smooth transition between the single-layer elastomer strap and each of the top plug surface and the bottom plug surface mitigating snagging on animal hair, the plug collar is sized to fit into the charm retaining hole and is connected at one end to the top side surface and at the other end to the bottom side surface, the flexible plug flexes to fit into the charm retaining hole, in a removable manner, pulling the top plug surface and the bottom plug surface against the single-layer elastomer strap creating a second moisture-resistant seal between the flexible plug and the top and bottom surfaces of the single-layer elastomer strap;
   wherein one of the flexible plug is fitted into each of the charm retaining hole that is absent a charm;
   wherein each of the charm retaining hole is positioned between the buckle and the plurality of buckle holes.

9. A method of using the animal collar of claim 8, the method comprising the steps of:
   securing at least one of the charm within at least one of the plurality of charm retaining hole; and
   securing the animal collar to an animal.

10. A method of using the animal collar of claim 8, the method comprising the steps of:
   securing at least one of the charm within at least one of the charm retaining hole;
   filling each of the charm retaining hole that remain open with one of the flexible plug; and
   securing the animal collar to an animal.

11. The animal collar in accordance with claim 8, further comprising:
   a strap retaining ring is secured to the single-layer elastomer strap proximate to the buckle.

12. The animal collar in accordance with claim 8, wherein the mesh material has a tensile strength greater than 10 pounds per square inch.

13. The animal collar in accordance with claim 8, wherein at least one of the emblem is a letter shape, a number shape, a character shape, a logo, a team logo, or an indicia shape.

14. An animal collar that is personalizable with charms, the animal collar comprising:
- a buckle;
- a mesh material;
- a single-layer elastomer strap is formed around and encapsulates the mesh material, the mesh material is configured to restrict elongation and increase the tensile strength of the single-layer elastomer strap, the elastomer strap attaches to the buckle, the elastomer strap having a plurality of buckle holes and a more than one of a charm retaining hole;
- a gripping texture is integrally formed on the surface of the single-layer elastomer strap, the gripping texture provides raised or recessed reliefs along the surface of the single-layer elastomer strap absent of creating an additional layer;
- at least one of a charm is secured into one or more of the charm retaining hole, the charm comprises an emblem, a first charm fastener side that is sized slightly larger than the charm retaining hole having a charm threaded portion and a first charm fastener beveled edge along the outer perimeter circumference, and a second charm fastener side that is sized slightly larger than the charm retaining hole having a charm threaded insert portion and a second charm fastener beveled edge along the outer perimeter circumference, each of the first charm fastener beveled edge and the second charm fastener beveled edge creates a smooth transition between the single-layer elastomer strap and each of the first charm fastener side and the second charm fastener side mitigating snagging on animal hair, the charm threaded portion and the charm threaded insert portion fasten together through the charm retaining hole, pulling the first charm fastener side and the second charm fastener side together against the single-layer elastomer strap creating a first moisture-resistant seal between the charm and the top and bottom surfaces of the single-layer elastomer strap, the emblem is affixed to either the first charm fastener side or the second charm fastener side; and
- at least one of a flexible plug is formed as a single piece of flexible material, the plug comprises a top plug surface that is sized larger than the charm retaining hole and having a first flexible plug beveled edge along the outer perimeter circumference, a bottom side surface that is sized larger than the charm retaining hole and having a second flexible plug beveled edge along the outer perimeter circumference, and a plug collar, each of the first flexible plug beveled edge and the second flexible plug beveled edge creates a smooth transition between the single-layer elastomer strap and each of the top plug surface and the bottom plug surface mitigating snagging on animal hair, the plug collar is sized to fit into the charm retaining hole and is connected at one end to the top side surface and at the other end to the bottom side surface, the flexible plug flexes to fit into the charm retaining hole, in a removable manner, pulling the top plug surface and the bottom plug surface against the single-layer elastomer strap creating a second moisture-resistant seal between the flexible plug and the top and bottom surfaces of the single-layer elastomer strap;
- wherein one of the flexible plug is fitted into each of the charm retaining hole that is absent a charm;
- wherein at least one of the emblem is a letter shape, a number shape, a character shape, a logo, a team logo, or an indicia shape.

15. The animal collar in accordance with claim 14, wherein each of the charm retaining hole is positioned between the buckle and the plurality of buckle holes.

16. A method of using the animal collar of claim 14, the method comprising the steps of: securing at least one of the charm within at least one of the plurality of charm retaining hole; and securing the animal collar to an animal.

17. A method of using the animal collar of claim 14, the method comprising the steps of: securing at least one of the charm within at least one of the charm retaining hole; filling each of the charm retaining hole that remain open with one of the flexible plug; and securing the animal collar to an animal.

18. The animal collar in accordance with claim 14, further comprising: a strap retaining ring is secured to the single-layer elastomer strap proximate to the buckle.

19. The animal collar in accordance with claim 14, wherein the mesh material has a tensile strength greater than 10 pounds per square inch.

\* \* \* \* \*